(12) United States Patent
Sellnau

(10) Patent No.: US 10,012,185 B2
(45) Date of Patent: Jul. 3, 2018

(54) FAST GDCI HEATED AIR INTAKE SYSTEM

(71) Applicant: DELPHI TECHNOLOGIES IP LIMITED, St. Michael (BB)

(72) Inventor: Mark C. Sellnau, Bloomfield Hills, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 164 days.

(21) Appl. No.: 15/043,743

(22) Filed: Feb. 15, 2016

(65) Prior Publication Data

US 2017/0234275 A1    Aug. 17, 2017

(51) Int. Cl.
*F02M 31/13*    (2006.01)
*F02M 31/135*    (2006.01)
*F02D 33/00*    (2006.01)

(52) U.S. Cl.
CPC .......... *F02M 31/135* (2013.01); *F02D 33/00* (2013.01)

(58) Field of Classification Search
CPC .............................. F02M 31/135; F02D 33/00
USPC ................................................ 123/549, 556
See application file for complete search history.

(56) References Cited

U.S. PATENT DOCUMENTS

| | | | | |
|---|---|---|---|---|
| 4,089,214 | A * | 5/1978 | Egami ................... | F02D 41/187 123/487 |
| 4,094,275 | A * | 6/1978 | Auiler ..................... | F02D 35/00 123/549 |
| 4,366,798 | A * | 1/1983 | Goto ..................... | F02M 31/135 123/545 |
| 6,083,369 | A * | 7/2000 | Tanigawa ........... | G01N 27/4067 204/424 |
| 8,003,922 | B2* | 8/2011 | Seger .................... | H05B 1/0236 123/556 |
| 8,981,264 | B2* | 3/2015 | Seger ..................... | F02M 31/13 123/549 |
| 2006/0150958 | A1* | 7/2006 | Gill ........................ | F02M 31/13 123/549 |
| 2007/0252559 | A1* | 11/2007 | Uhl ...................... | F02N 11/0866 320/166 |
| 2009/0178651 | A1* | 7/2009 | Gale ................... | F02D 41/0025 123/472 |

* cited by examiner

*Primary Examiner* — Marguerite McMahon
(74) *Attorney, Agent, or Firm* — Joshua M. Haines

(57) ABSTRACT

A GDCI engine control system includes a fast electric heater located within a pocket in a cylinder head. The pocket is in fluid communication with multiple intake ports. A heater control system includes a capacitor that is configured to provide a voltage that is greater than battery voltage to more quickly heat the intake air during a cold start. Subsequently a lower voltage can be supplied to the heater.

11 Claims, 4 Drawing Sheets

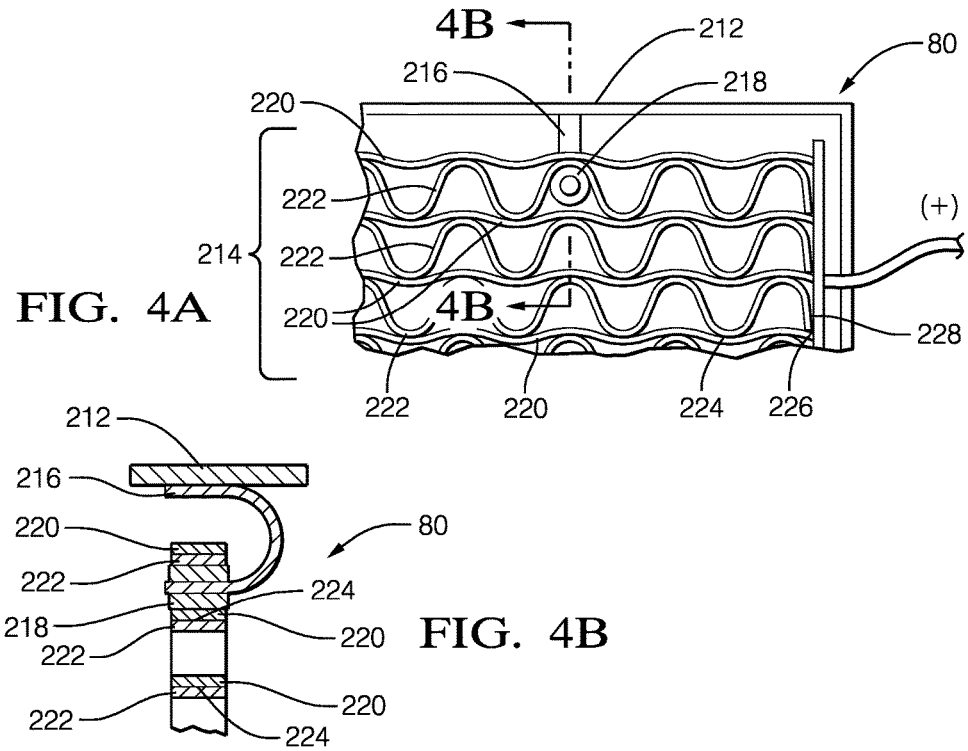
FIG. 4A
FIG. 4B
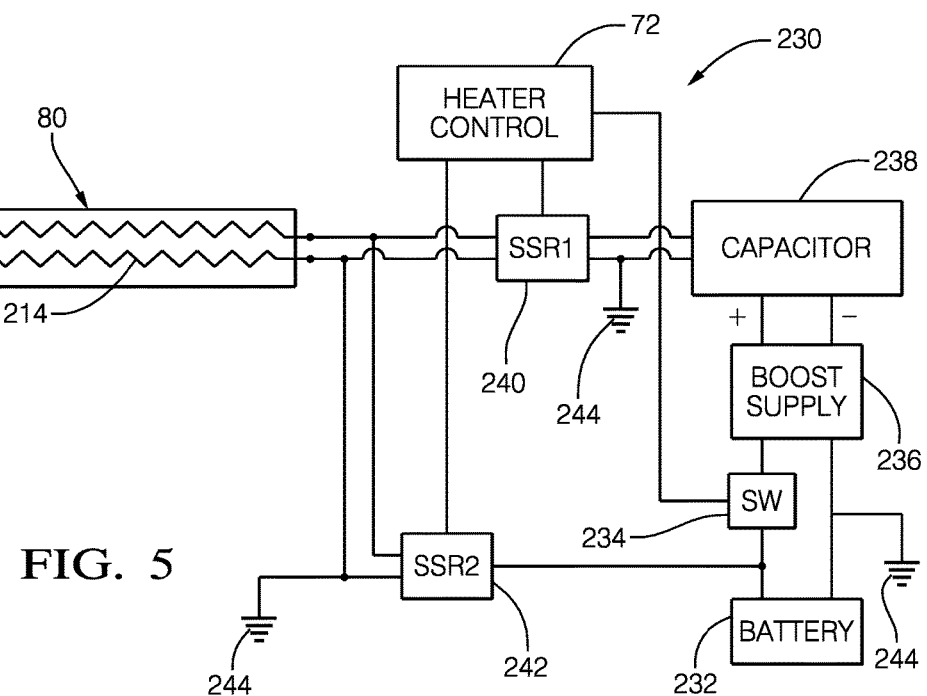
FIG. 5

FAST GDCI HEATED AIR INTAKE SYSTEM

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to an engine control system and heater used to heat an air intake system in a Gasoline Direct-Injection Compression-Ignition (GDCI) engine.

GDCI engines utilize electric air heating during cold starts to heat the intake air prior to induction into the cylinder. A successful GDCI cold start requires that the intake air be heated very quickly with minimal air preheat times. In one example, commercially available coil heater plugs are located in each intake runner within the intake manifold upstream from the intake valve. These heaters exhibit good durability, however, they have poor heating characteristics due to their relatively low surface area and relatively high heater mass. As a result, the heating effectiveness is low and heats up times are undesirably long.

SUMMARY

In one exemplary embodiment, an internal combustion engine heater control system includes a heater that is in fluid communication with a combustion chamber. A battery provides a first supply voltage. A capacitor is connected to the battery and provides a second supply voltage greater than the first supply voltage. A switching element is arranged between the capacitor and the heater. A controller is in communication with the switching element and is configured to selectively connect the second supply voltage to the heater.

In a further embodiment of the above, an air gas path is arranged upstream from the combustion chamber. The heater is arranged in the air gas path.

In a further embodiment of any of the above, a cylinder head with multiple intake ports discrete from one another. A pocket is provided in the cylinder head interconnecting the intake ports, the heater arranged in the pocket, and an intake manifold secured to the cylinder head over the pocket.

In a further embodiment of any of the above, the battery is a 12 volt battery.

In a further embodiment of any of the above, a boost supply is configured to step up the first supply voltage to the second supply voltage.

In a further embodiment of any of the above, the second supply voltage is 48 volts.

In a further embodiment of any of the above, the switching element is a solid state relay. The controller provides a pulse width modulation signal to the solid state relay.

In a further embodiment of any of the above, there is a relay between the battery and the heater. The controller is in communication with the relay. The controller is configured to connect the capacitor to the heater with the switching element for a first time period. The controller is configured to connect the battery to the heater with the relay for a second time period subsequent to the first time period.

In a further embodiment of any of the above, a switch connects the battery to the boost supply. The controller is in communication with the switch. The controller is configured to connect the battery to the boost supply with the switch to recharge the capacitor.

In a further embodiment of any of the above, the heater includes a frame. First and second corrugated heating elements are arranged in alternating relationship in repeating rows to form a quadrilateral brick. The first corrugated heating element is substantially flatter than the second corrugated heating element. Hooks are secured to the frame and support the brick.

In another exemplary embodiment, an internal combustion engine heater includes a frame. First and second corrugated heating elements are arranged in alternating relationship in repeating rows to form a quadrilateral brick. The first corrugated heating element is substantially flatter than the second corrugated heating element. Hooks are secured to the frame and support the brick.

In a further embodiment of any of the above, an end sheet is secured to each of opposing ends of the brick. An electrical lead is secured to each end sheet.

In a further embodiment of any of the above, the first and second corrugated heating elements and the end sheets are brazed together.

In a further embodiment of any of the above, the hooks are U-shaped and an insulator is mounted to an end of each hook. The insulator is captured between a set of the first and second corrugated heating elements that adjoin one another.

In a further embodiment of any of the above, the brick includes a length and a width. The length is at least twice the width.

In another exemplary embodiment, a cylinder head for an internal combustion engine includes a body that provides multiple domes that are configured to provide a portion of a combustion chamber. The body provides a mounting face. Multiple ports discrete from one another and each are in fluid communication with a respective one of the multiple domes. A pocket is recessed from the mounting face and extends laterally across the multiple intake ports.

In a further embodiment of any of the above, an electric heater is arranged within the pocket.

In a further embodiment of any of the above, the multiple ports are intake ports. Multiple studs extend from the mounting surface and are configured to secure an intake manifold to the mounting surface.

In a further embodiment of any of the above, the pocket is rectangular.

In a further embodiment of any of the above, the heater includes a frame. First and second corrugated heating elements are arranged in alternating relationship in repeating rows to form a quadrilateral brick. The first corrugated heating element is substantially flatter than the second corrugated heating element, Hooks are secured to the frame and support the brick.

In another exemplary embodiment, a method of controlling a heater for an internal combustion engine comprising the steps of supplying a first voltage to a heater to provide a first rate of heating and heating a fluid flowing through the heater at a first rate. The heated fluid is flowed to a combustion chamber. A second voltage is supplied to the heater to provide a second rate of heating. The fluid flowing through the heater is heated at a second rate of heating that is less than the first rate after a predetermined time.

In a further embodiment of any of the above, the first voltage is 48 volts and the second voltage is 12 volts.

In a further embodiment of any of the above, the heating steps include receiving the fluid from an intake manifold and the flowing step includes supplying the heated fluid through multiple intake ports to the combustion chamber associated with each intake port of the multiple intake ports.

BRIEF DESCRIPTION OF THE DRAWINGS

The disclosure can be further understood by reference to the following detailed description when considered in connection with the accompanying drawings wherein:

FIG. 4A is an enlarged partial side view of the air intake heater shown in FIG. 4.

FIG. 4B is a cross-sectional view of the air intake heater shown in FIG. 4A taken along line 4B-4B.

FIG. 5 is a schematic of a heater control system for the air intake heater.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
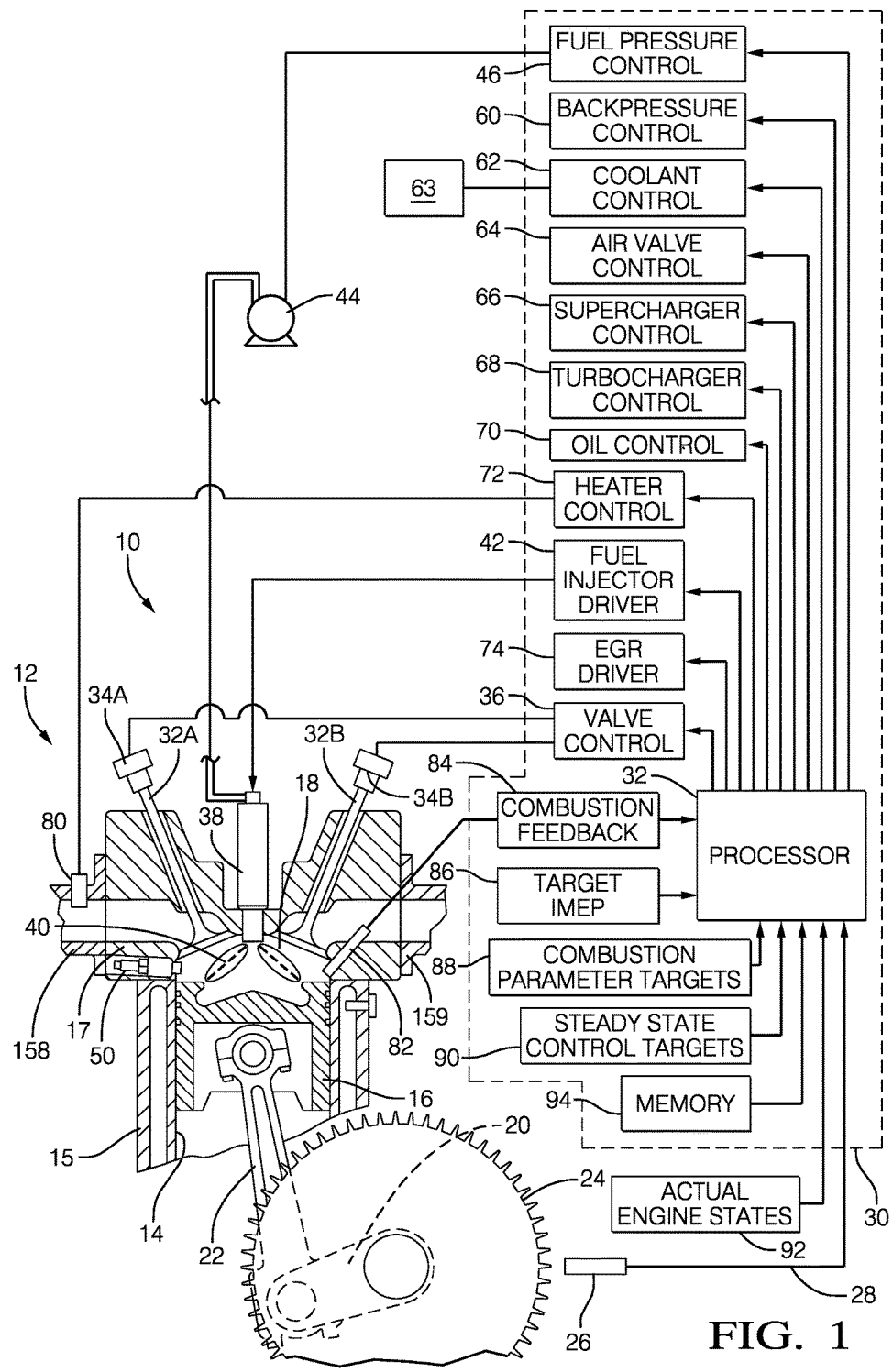
FIG. 1 is a schematic view of an embodiment of an engine control system suitable for controlling a GDCI engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, which is incorporated herein by reference in its entirety. This distributed-equivalence ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for combustion mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16. A region above the piston 16 and a dome of a cylinder head 17 define a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle θ, which corresponds to the linear position of the piston 16, and a crank speed N.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are driven by one or more camshafts to regulate the flow of air into and exhaust from the combustion chamber 18. In one embodiment, a cam phaser 34A, 34B is respectively coupled to each of the intake valve 32A and the exhaust valve 32B, to provide further control of lift and/or duration of the valves beyond that provided by the camshaft profile. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially mixed-mixture, low-temperature combustion process is used. Fuel 40 is injected by the fuel injector 38, where the fuel injector is fed by a fuel rail at a pressure in the range of 100 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
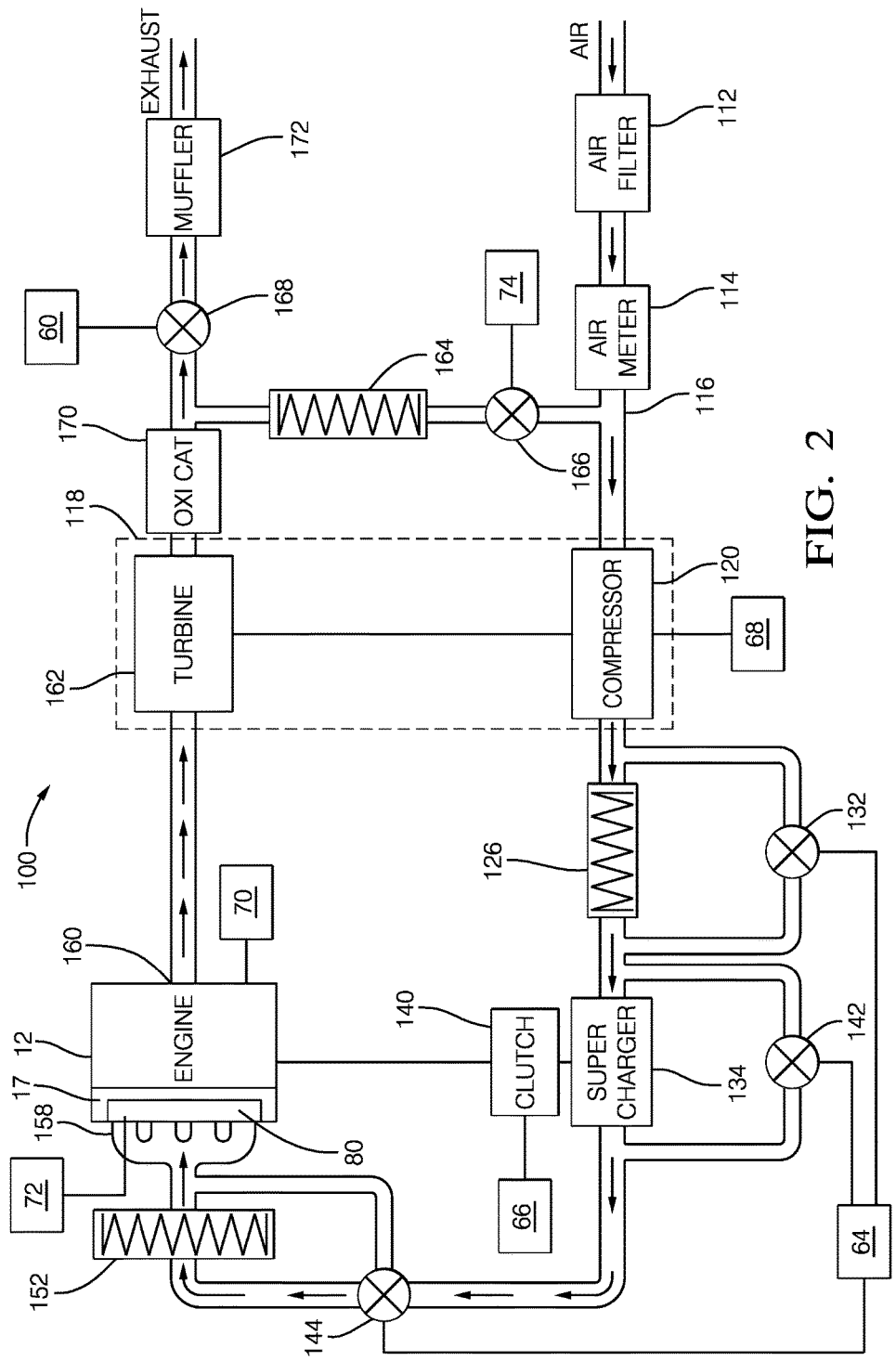
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a supercharger 134. A first charge air cooler bypass valve 132 is connected between an air inlet and an air outlet of the first charge air cooler 126 to selectively divert air around the first charge air cooler 126.

Air from first charge air cooler 126 is channeled to the air inlet of a supercharger 134, which is driven by the engine 12 through a controllable clutch 140 in communication with a supercharger control 66 (FIG. 1). A controllable supercharger bypass valve 142 allows air to bypass the supercharger 134. The air from the supercharger 134 and/or from the supercharger bypass valve 142 is channeled to a second charge air cooler bypass valve 144. The second charge air cooler bypass valve 144 selectively provides air to a second charge air cooler 152 and/or an air intake manifold 158 of the engine 12, which is secured to the cylinder head 17 upstream from the combustion chamber 18 (FIG. 1). An air valve control 64 (FIG. 1) is in communication with the first charge air cooler bypass valve 132, supercharger bypass valve 142 and second charge air cooler bypass valve 144 to coordinate the flow of air therethrough.

An air intake heater 80 is arranged in the cylinder head 17 downstream from the air intake manifold 158, which is discussed in more detail below in connection with FIGS. 3A-3B. The air intake heater 80 is in communication with a heater control 72 (FIG. 1). Alternatively, multiple heat sources may be associated with each intake port of a corresponding cylinder 14 of the engine 12 to provide individualized control of heated intake air to each combustion chamber 18.

With continuing reference to FIG. 2, following a combustion event, exhaust gas exits one or more exhaust ports 160 of an exhaust manifold 159 (FIG. 1) and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 166 that is controlled by an EGR driver 74 (FIG. 1), to be reintroduced into the intake air stream at air duct 116. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

Figure 3A:
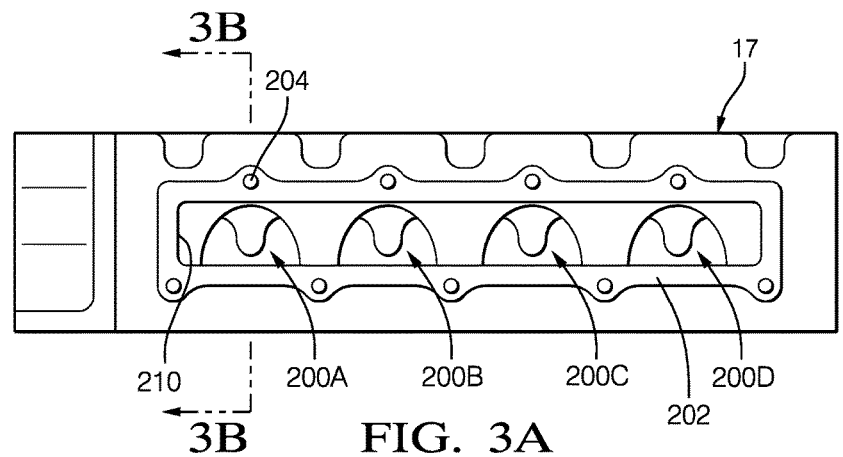
FIG. 3A is a side view of a cylinder head.
Figure 3B:
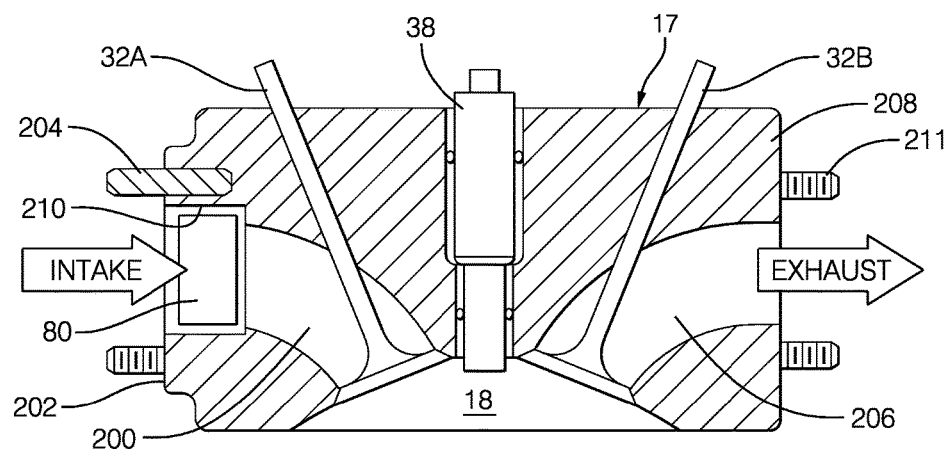
FIG. 3B is a cross-sectional view of the cylinder head shown in FIG. 3A taken along line 3B-3B.

An example cylinder head 17 for a four cylinder engine is shown in FIGS. 3A-3B. The cylinder head 17 includes four intake ports 200A-200D that are discrete from one another. It should be understood that the cylinder head can include any number of intake ports, and the intake ports can be arranged in other configurations than shown.

The cylinder head 17 includes an intake mounting surface 202 having multiple fasteners 204 (e.g., studs) used to secure the intake manifold 158 (FIG. 1) to the cylinder head 17. The intake mounting surface 202 surrounds a pocket 210, rectangular for example, that is recessed with respect to the mounting surface 202 and extends laterally to interconnect the intake ports 200A-200D. The heater 80 is arranged in the pocket 210 to heat the intake air flowing from the intake manifold 158 to the combustion chamber 18. With the engine 12 assembled, the intake manifold 158 is arranged upstream from and covers the pocket 210. Alternatively, the pocket 210 can be provided in the intake manifold 158, but arranging the pocket 210 in the cylinder head 17 enables the heater 80 to be more closely positioned to the combustion chamber 18, which reduces heat losses.

The cylinder head 17 also includes exhaust ports 206 and an exhaust mounting surface 208 surrounding the exhaust ports 206. The exhaust manifold 159 is secured to the exhaust mounting surface 208 over the exhaust ports 206 using fasteners 211 (e.g., studs).

The heater 80 is electric and is used to preheat the intake air during a cold start, for example. The heater 80 is then turned off soon after the engine is started. It is desirable to provide a heater with a very high surface area and very low mass. The heater control system should also provide sufficient energy capacity to quickly heat the intake air with minimal burden on the vehicle 12 volt battery and charging system.

Figure 4:
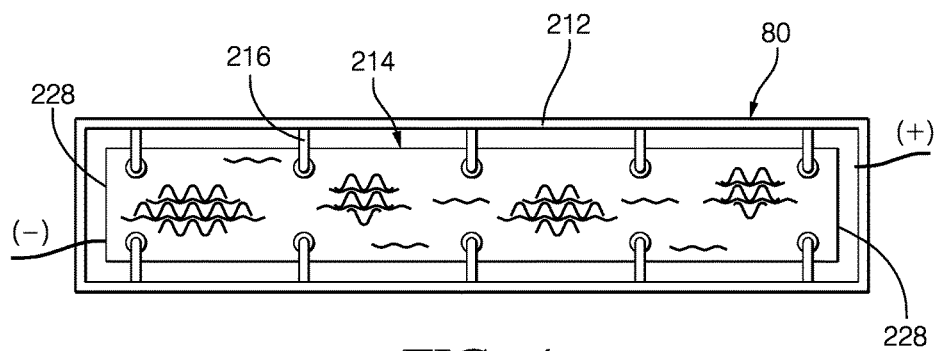
FIG. 4 is a schematic side view of an air intake heater.

One example heater 80 is shown in FIGS. 4-4B. A fast, high surface area, low mass electric heater is provided that is based on a high temperature foil heating element. Heater 80 includes a rectangular frame 212 that mounts inside the cylinder head pocket 210 just upstream of the intake valves 32A (FIG. 3B). An electric heating element 214 is supported within the frame 212 by U-shaped hooks 216 having an insulator 218 at one end. First and second corrugated heating elements 220, 222 are arranged in alternating relationship in repeating rows to form a quadrilateral brick of highly thermally conductive material. The brick includes a length and a width, wherein the length is at least twice the width. In the case of a four cylinder engine, the length may be at least four times the width.

The first corrugated heating elements 220 are substantially flatter than the second corrugated heating element 22 and are nested relative to one another such that the peaks of one layer are received in the valleys of the adjoining layer at first brazed joints 224. The insulators 218 are received between a set of the first and second corrugated heating elements 220, 222 that adjoin one another.

An end sheet 228 is arranged at each opposing end of the heating element 214 and is secured to the ends of the first and second corrugated heating elements 220, 222 at second brazed joints 226. The end sheets 228 provide electrical continuity across the ends of the corrugated heating elements 220, 222. In one example, a positive electrical lead is secured to one end sheet 228, and a negative electrical lead is secured to the other end sheet 228 (FIG. 4). In this manner, current flows from one side of the heating element 214 lengthwise to the other side of the heating element.

A schematic of a heater control system 230 is shown in FIG. 5. The heater control system 230 provides extremely fast warmup of the heater element 214. A 12 volt battery 232 provides a first supply voltage. A capacitor 238, for example 48V, is connected to the battery 232 and provides a second supply voltage that is greater than the first supply voltage. A boost supply 236 is configured to step up the first supply voltage to the second supply voltage. One or more grounds 244 are used.

Since multiple cold starts may be required, the storage capacitor is sized to store enough energy for three or more cold starts at −25° C. ambient temperature, for example, 5 to 15 farads of about 18 kJ of electrical energy at 48V. However, capacitors with other characteristics can be used. The 48V boost supply 236 charges the storage capacitor from the 12V charging system. After engine start, current to the heater would continue for a short time. Current could be supplied from the storage capacitor or from the 12V battery. The boost supply 236 would turn on and charge the capacitor back to 48V. The capacitor 238 achieves full state of charge within several minutes.

One or more switching elements 234, 240, 242 are in communication with the heater control 72 and are used to selectively control the flow of current between the various components of the heater control system 230. The switching element 234 is a switch that connects the battery 232 to the boost supply 236. The heater control 72 is in communication with the switch 234 and is configured to connect the battery 232 to the boost supply 234 with the switch 234 to recharge the capacitor 238 when desired.

In one example engine, between 100 and 300 Watts of heat should be transferred to the air in each cylinder depending on ambient temperature for desired GDCI combustion. The storage capacitor provides an energy source separate from the vehicle 12V charging system. Electrical energy is stored at voltages above 12V to enable higher current, more rapid heating of the heater element, and increased energy storage density. The capacitor eliminates the possible need for a second 12V battery and has high current capability.

In one example, the switching elements 240, 242 are solid state relays (SSR) that control the current to the heater 80 via a pulse width modulation (PWM) signal. The heater control 72 is configured to connect the capacitor 238 to the heater 80 with the switching element 240 for a first time period. The heater control 72 is configured to connect the battery 232 to the heater 80 with the switching element 242 for a second time period subsequent to the first time period.

Initially upon cold starting, the switching elements 240 provides a high current pulse to the heater. The current pulse is a calibrated discharge prior to engine cranking that depends on the thermal state of the engine and ambient air temperature. The duration of this current pulse would be less than 1 second, for example. The switching element 240 is a high current device controlled by pulse width modulated (PWM) signals from the engine controller. Upon engine cranking, lower current levels would be supplied from the capacitor 238 through the switching element 240 to maintain intake air temperatures in the target range for GDCI combustion. Alternatively, the lower current levels could be supplied from the 12V battery 232 via the switching element 242.

A 12V storage capacitor would not provide faster heating than a 12V battery since the current is limited by the resistance of the heater element. However, a 48V capacitor would provide initial current levels four times higher than a 12V capacitor. Since heating power scales with both current and voltage, much greater heating power is available. Therefore, a 48V capacitor has much greater energy storage density than a similar 12V capacitor.

The disclosed fast intake air heater system for GDCI provides an extremely fast air heating rate from energy a 48V storage capacitor, for example. The system also features a high area, low-mass, heater element, a storage capacitor, a 48V boost power supply, and solid state relays with current controlled by the heater control.

In one embodiment, the system described above supplies a first voltage to the heater 80 to provide a first rate of heating such that fluid flowing through the heater is heated at a first rate. This heated fluid flows to the combustion chamber 18 to better enable GDCI combustion. A second voltage is the supplied to the heater 80 after a predetermined time to provide a second rate of heating such that the fluid flowing through the heater 80 is heated at a second rate of heating that is less than the first rate.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An internal combustion engine heater control system comprising:
   a heater in fluid communication with a combustion chamber;
   a battery providing a first supply voltage;
   a capacitor connected to the battery and providing a second supply voltage greater than the first supply voltage;
   a switching element arranged between the capacitor and the heater; and
   a controller in communication with the switching element and configured to selectively connect the second supply voltage to the heater.

2. The heater control system according to claim 1, comprising an air gas path arranged upstream from the combustion chamber, the heater arranged in the air gas path.

3. The heater control system according to claim 2, comprising a cylinder head with multiple intake ports discrete from one another, and a pocket provided in the cylinder head interconnecting the intake ports, the heater arranged in the pocket, and an intake manifold secured to the cylinder head over the pocket.

4. The heater control system according to claim 1, wherein the battery is a 12volt battery.

5. The heater control system according to claim 4, comprising a boost supply configured to step up the first supply voltage to the second supply voltage.

6. The heater control system according to claim 5, wherein the second supply voltage is 48 volts.

7. The heater control system according to claim 1, wherein the switching element is a solid state relay, and the controller provides a pulse width modulation signal to the solid state relay.

8. The heater control system according to claim 1, comprising a relay between the battery and the heater, the controller in communication with the relay, the controller configured to connect the capacitor to the heater with the switching element for a first time period, and the controller configured to connect the battery to the heater with the relay for a second time period subsequent to the first time period.

9. The heater control system according to claim 1, comprising a switch connecting the battery to the boost supply, the controller in communication with the switch, and the controller configured to connect the battery to the boost supply with the switch to recharge the capacitor.

10. The heater control system according to claim 1, wherein the heater includes a frame, first and second corrugated heating elements arranged in alternating relationship in repeating rows to form a quadrilateral brick, the first corrugated heating element substantially flatter than the second corrugated heating element, and hooks secured to the frame and supporting the brick.

11. The heater control system according to claim 1, comprising a boost supply configured to step up the first supply voltage to the second supply voltage.

* * * * *